United States Patent [19]

Devault et al.

[11] 4,446,555

[45] May 1, 1984

[54] TIME DIVISION MULTIPLEX SWITCHING NETWORK FOR MULTISERVICE DIGITAL NETWORKS

[76] Inventors: Michel Devault, 22, rue de Bourgogne, Lannion, France, 22300; Jean-Paul Quinquis, Rue de Cornic, Perros Quirec, France, 22700; Yvon Rouaud, Les Fontaines A. 33, Lannion, France, 22300

[21] Appl. No.: 350,891

[22] Filed: Feb. 22, 1982

[30] Foreign Application Priority Data

Feb. 20, 1981 [FR] France .............................. 81 03440

[51] Int. Cl.³ .............................................. H04J 3/02
[52] U.S. Cl. ........................................ 370/94; 370/95
[58] Field of Search ...................... 370/60, 94, 92, 95, 370/85

[56] References Cited

PUBLICATIONS

Flexible Multiplexing Technique with Two Types of Packet for Circuit and Packet Switched Traffic, Transactions of the IECE of Japan, vol. E64, #6, Jun. 1981.
An Architecture for a Flexible Integrated Voice/Data Switch, ICC '80 1980 International Conf. on Comm. Seattle, Wa. USA, 8-12 Jun. 1980.
"Pacuit" Switching Combines Two Techniques in One Network, Computer Design, vol. 15, #6, pp. 83-88, Jun. 1976.
"Design Approaches & Performance Criteria for Integrated Voice/Data Switching," vol. 65, 1977.

Primary Examiner—Douglas W. Olms
Assistant Examiner—Kenneth I. Rokoff
Attorney, Agent, or Firm—Lowe, King, Price & Becker

[57] ABSTRACT

Asynchronous time division multiplex switching network for multi-service digital network. It comprises a plurality of time division multiplex bidirectional highways, a plurality of data transmit and receive stations connected to and associated with said bidirectional highways and a plurality of buses connecting these stations therebetween. The highways convey digital data arranged in a hybrid frame including a time slot part formed of a plurality of time slots containing sample words having a variable number of bits and a packet channel part formed of a plurality of channels for packets having a variable number of bits. Means are provided in each transmit station for converting the sample words in the time slot part and the packets in the packet channel part into a message including the sample word proper, its number of bits, the address of the terminating highway, the number of the time slot in the hybrid frame and a first indicator marking the sample words and, the packet proper, its number of bits, the address of the terminating highway, the number of the packet channel in the hybrid frame and a second indicator marking the packets. The messages are then transmitted and in the receive station, the items added to form the messages are deleted, leaving only the sample words and packets.

2 Claims, 9 Drawing Figures

TIME DIVISION MULTIPLEX SWITCHING NETWORK FOR MULTISERVICE DIGITAL NETWORKS

BACKGROUND OF THE INVENTION

1. Field of the Invention

The present invention relates to a digital switching network for switching digital channels that serve in establishing communications for multiservices such as telephony, data transmission, videotelephony, etc.

Switching systems have already been put forward for multiservice digital networks suited to hybrid switching or, in other words, for switching time division multiplex circuits by synchronous digital time division switching networks and for packet switching using asynchronous packet switching networks. These switching systems do not allow:

1. circuits with any given bit-rates to be switched since a synchronous time division multiplex switching network has just a single bit-rate, e.g. 64 kbit/s for a PCM time division multiplex switching system having frames of 125 μs containing octets of 8 bits.

2. A variable proportion of circuits and packets to be switched unless of course each switching network (circuit or packet) is dimensioned for the overall maximum bit-rate processed by the switching system.

These switching systems therefore imply, in practice, a rigid association between service classes and switching techniques (in this case voice switching corresponds to circuit switching and switching of data corresponds to packet switching) which limits the possibilities of future development bound to new economic optima (e.g. packetized voice switching) or the introduction of new services (e.g. low bit-rate data circuit-mode switching).

An asynchronous time division switching system makes it possible, however, to switch a variable proportion of time division circuits and miscellaneous bit-rate packets by generalizing their processing in one and the same type of equipment.

2. Description of the Prior Art

Figure 1A:
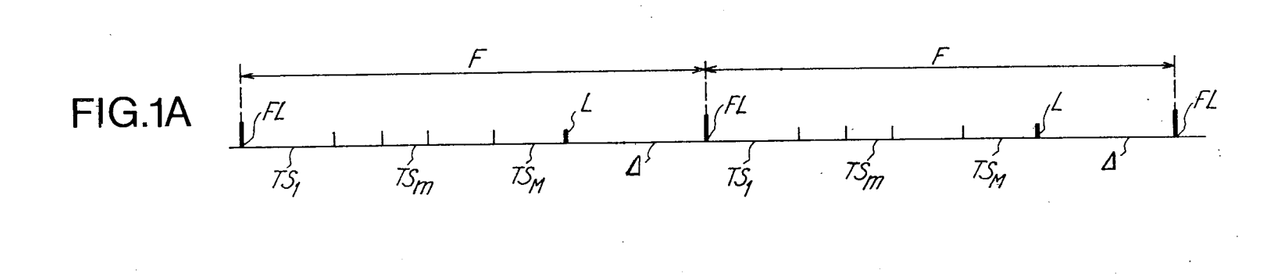
FIG. 1A schematizes the breakdown of a hybrid frame and has been disclosed in the introductory part.

Time division hybrid multiplex data arrangements are already known that are intended for either circuit-mode or packet-mode switching (see Design Approaches and Performance Criteria for Integrated Voice/Data Switching by Myron J. Ross, Arthur C. Tabbot and John A. Waite, Proceedings of the IEEE, Vol. 65, No. 9 of September 1977). The time-interval distribution of a hybrid frame containing sample words and packets is depicted in FIG. 1A. F represents the frame, FL the frame limit indicator and L the limit between the synchronous time slot part of the frame containing time slots $TS_i$ and the channel Δ intended for the packets.

In that part of the frame given over to the time slots (from FL to L), each time slot is allocated to a communication and only one. The bit-rate in a slot is thus guaranteed and characterized by the slot length. The various time slots $TS_1$, $TS_i$, $TS_j$ constitute a synchronous time-division multiplex.

That part of the frame reserved for the packets (from L to FL) is divided between several packet-mode communications channels. The packet making up one and the same communication are indicated by a packet number that they carry together with the data. This is the case of an asynchronous time division multiplex.

Described in U.S. patent application No. 210,819 filed Nov. 25, 1980 is a multiprocessor system comprising a plurality B of buses, a plurality of at the most $B(B-1)/1)/2$ microprocessors each connected to a bus pair where each of the pairs connecting the multiprocessors are different and each bus is connected to at the most (B−1) microprocessors. It results from this that an originating microprocessor is connected directly via its two connection buses to 2(B−2) terminating microprocessors and indirectly to (B−2) (B−3)/2 terminating microprocessors via at the most one transit or relay microprocessor directly connected to both the originating microprocessor and the terminating microprocessor. Consequently, considering one originating microprocessor amongst the B(B−1)/2 microprocessors, there are:

B(B−1)/2−1=(B−2) (B+1)/2 terminating microprocessors possible. Out of these (B−2) (B+1)/2 terminating microprocessors, 2(B−2) are wired directly to the originating microprocessor and (B−2) (B−3)/2 are wired to it indirectly via a single relay microprocessor. It is confirmed that $$2(B-2) + \frac{(B-2)(B-3)}{2} = \frac{(B-2)(B+1)}{2}$$

The system that has just been summarized for recap purposes affords numerous advantages, notably:

By taking as address of a given microprocessor the concatenation of the two addresses of the buses that are connected to it, i.e. by taking (ab) or (ba) as the address of the microprocessor connected to buses a and b, the microprocessor that recognizes its address transmitted by a bus connected thereto knows that it is the terminating microprocessor and, further, if it recognizes only a or only b in (ab) or (ba), then it knows itself to be a relay microprocessor and automatically interconnects its two buses one to the other. This property will be brought into play hereinafter by expressing the addresses of the switching stations to which the multiplex highways are connected in the (x, y) form.

Means now exist for connecting thirty or so microprocessors to a series bus having a 10 Mbit/s bit-rate. Consequently, B1 = 30 and B = 31. The network has 31 buses to which can be connected a maximum of B(B−1)/2 = 435 microprocessors. The maximum theoretical traffic is thus virtually 300 Mbit/s which permits a practical bit-rate of 200 Mbit/s.

SUMMARY OF THE INVENTION

In keeping with the invention, the asynchronous time division switching system for multiservice digital networks comprises a plurality of multiplex bidirectional highways conveying digital signals spread over hybrid frames including time slots containing sample words, where the said time slots may have different bit numbers and additional channels containing packets, a plurality of data transmission and reception stations each connected to a bidirectional multiplex highway and a transfer network formed of buses interconnecting the said stations; it is characterized in that the system comprises first means for converting the sample words and the packets from the originating multiplex highway connected thereto into a message by adding to them (i) the address of the terminating multiplex highway, (ii) the rank of the time slot or packet additional channel in the hybrid frame of the said multiplex highway, (iii) the sample word or packet bit number and (iv) an indicator bit or bit group for distinguishing the sample words from the packets, means for transmitting the said messages between the station connected to the originating multiplex highway and the station connected to the terminating multiplex highway, second means for converting the messages into sample words or packets according to the indicator bit or bit group marking the sample words or packets respectively by deleting therein the information added by the first conversion means and means for inserting each sample word or each packet into the hybrid frame of the terminating multiplex highway in terms of the time slot or packet channel number.

BRIEF DESCRIPTION OF THE DRAWINGS

The invention will now be described in detail with reference being made to the accompanying drawings in which.

Figure 1B:
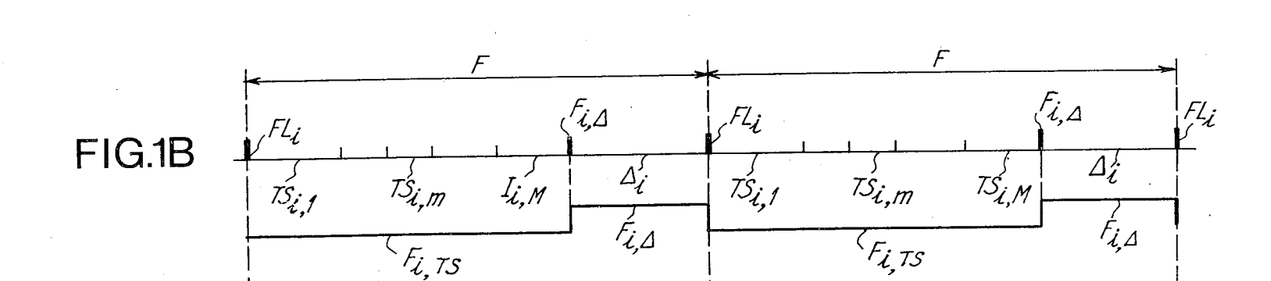
FIGS. 1B and 1C represent the two directions of a bidirectional hybrid frame multiplex highway.
Figure 1C:
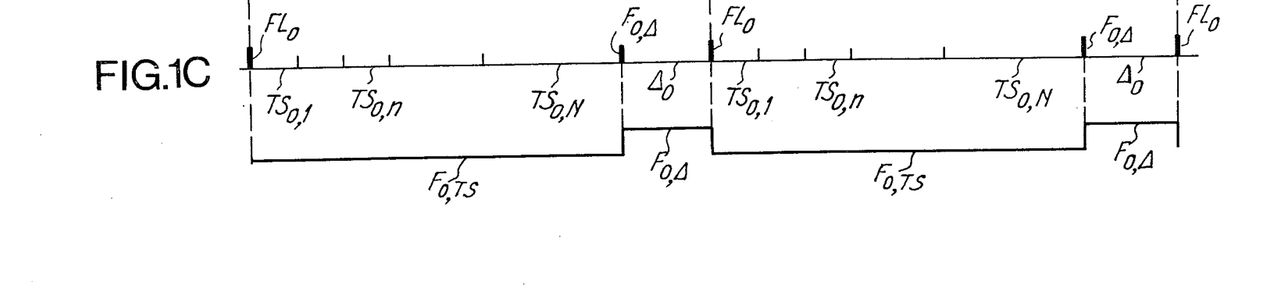

In reference to FIGS. 1B and 1C, the hybrid frame F comprises time slots $TS_{i,m}$, $TS_{o,n}$ (depending on whether the time slots are coming in or going out) where $1 \leq m \leq M$ and $1 \leq n \leq N$. The time slots do not all have the same bit capacity. The bit capacity of time slot $TS_{i,m}$ or $TS_{o,n}$ will be represented by $\lambda_m$ or $\lambda_n$ respectively. The hybrid frame also comprises time division channels marked as $\Delta_i$ or $\Delta_o$ and given over to packets. The total number of bits per frame is known and it is possible, from the clock signal $H_i$ or $H_o$ and the frame-limit signal $FL_i$ or $FL_o$, to deduce pulses $F_{i,TS}$, $F_{i,\Delta}$, $F_{o,TS}$, $F_{o,\Delta}$ dividing respectively the incoming frame and the outgoing frame into a time slot part $F_{i,TS}$ and $F_{o,TS}$ and a packet part $F_{i,\Delta}$ and $F_{o,\Delta}$. The sample words $W_m$ or $W_n$ occupying the time slots $TS_{i,m}$ and $TS_{o,n}$ are transmitted during the time slot frame part $F_{i,TS}$ and $F_{o,TS}$ and the packets $P_m$ or $P_n$ are transmitted during the packet frame parts $F_{i,\Delta}$ and $F_{o,\Delta}$.

Figure 2:
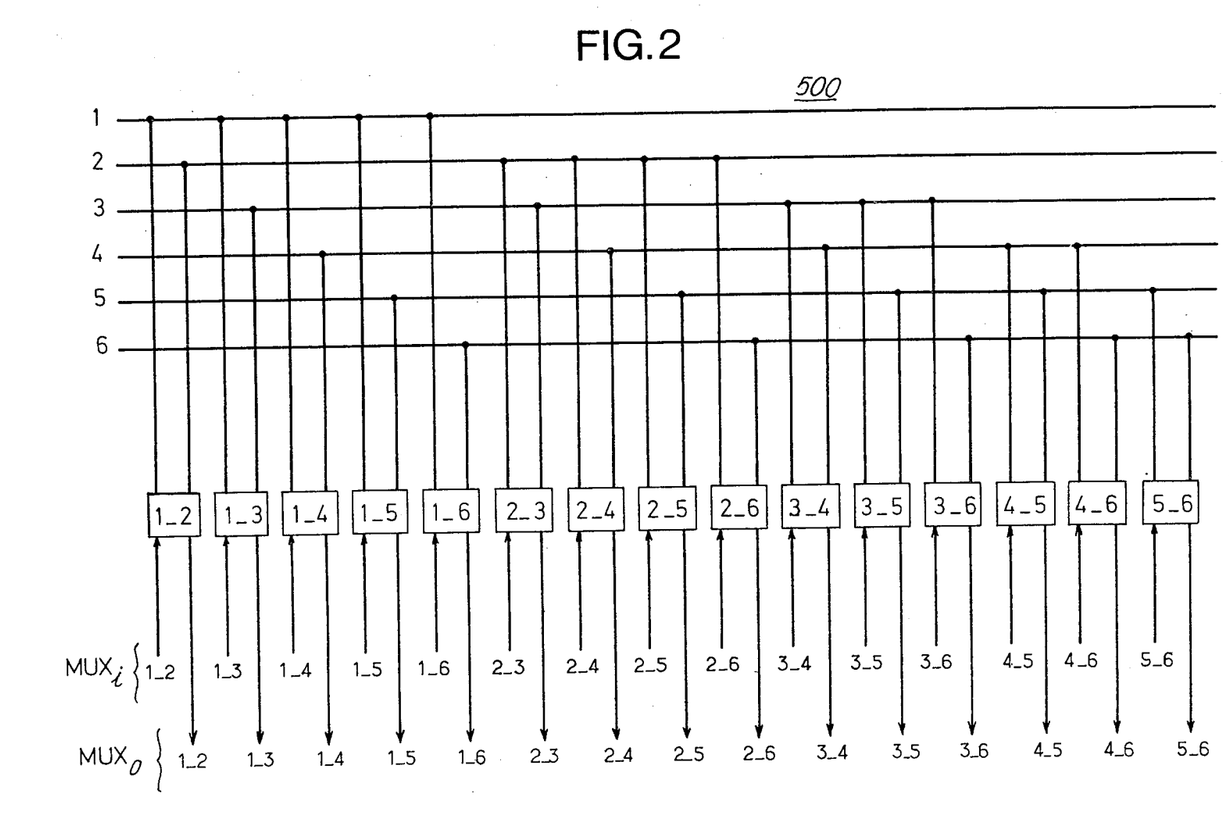
FIG. 2 depicts the multiprocessor system employed as an asynchronous time-division switching system in this invention.

FIG. 2 depicts a transfer network 500 between the switching stations. There are B=6 buses numbered 1 to 6 and B(B−1)/2=15 stations each joined to two buses and having as addresses the concatenation of the addresses of those buses to which they are joined. Connected to each station is a bidirectional time-division multiplex ghway given as $MUX_i$ for the incoming direction and $MUX_o$ for the outgoing direction. These multiplex highways have the same addresses as the stations to which they are connected.

Figure 3:
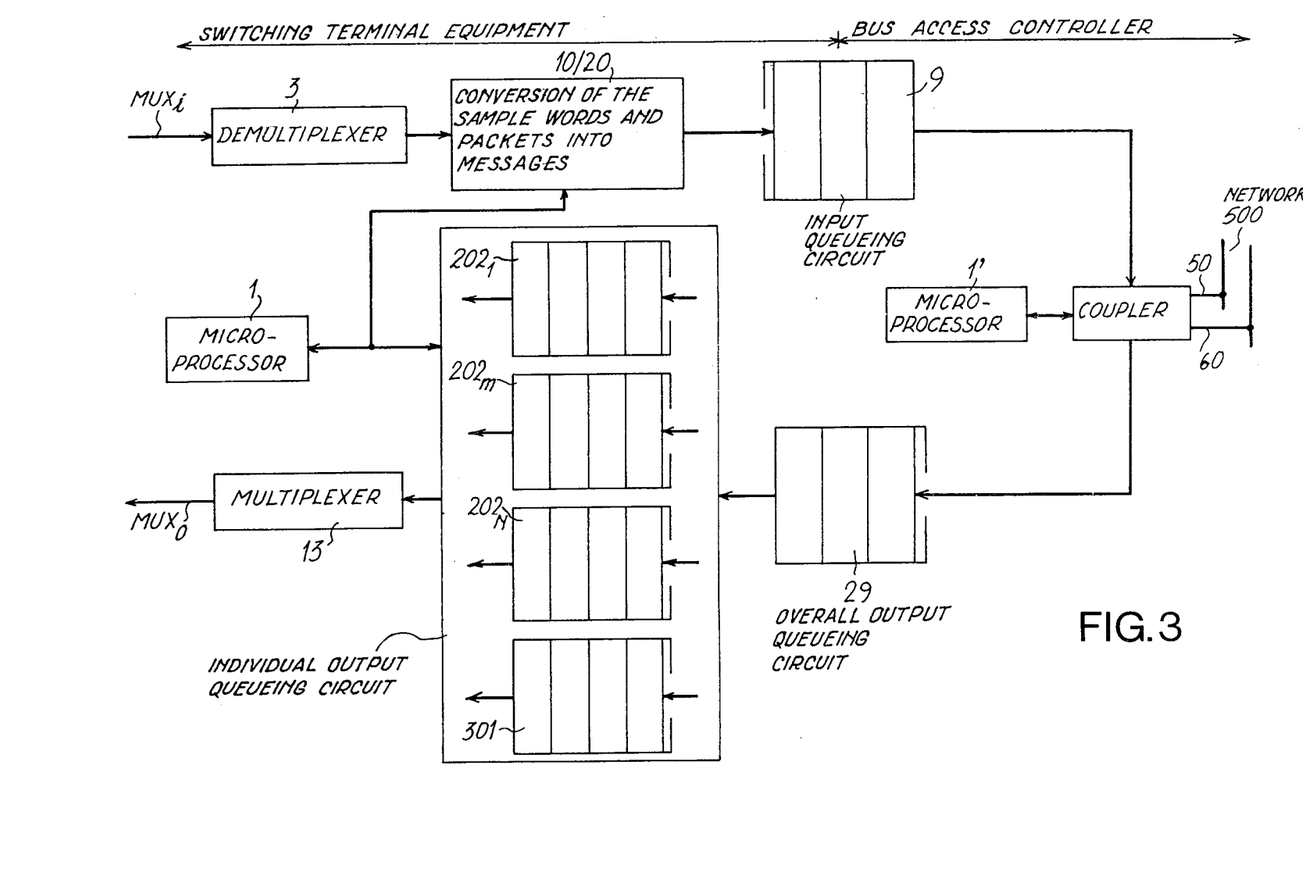
FIG. 3 schematizes a switching station of the asynchronous time-division switching system as in FIG. 2.

FIG. 3, in block diagram form, represents a switching station. It is composed of a terminal switching equipment item controlled by a microprocessor 1 and a bus access controller coupled by two buses 50 and 60 forming a part of network 500. The terminal switching equipment and the bus access controller communicate via two stack or queueing circuits 9 and 29.

The bus access controller is identical to the one in U.S. patent application No. 210,819. It consists of a coupler for access to the two buses 50 and 60 controlled by a microprocessor 1'.

The receiver terminal switching half-equipment chiefly comprises a demultiplexer 3 and a circuit for converting sample words and packets into messages 10/20.

The transmit terminal switching half-equipment comprises stack or queueing circuits $202_1 \ldots 202_m \ldots 202_M$ for the various hybrid frame time slots, a queueing circuit for the packets 301 where all these queueing circuits are connected to a multiplexer 13 itself connected to the outgoing multiplex highway $MUX_o$.

Figure 4:
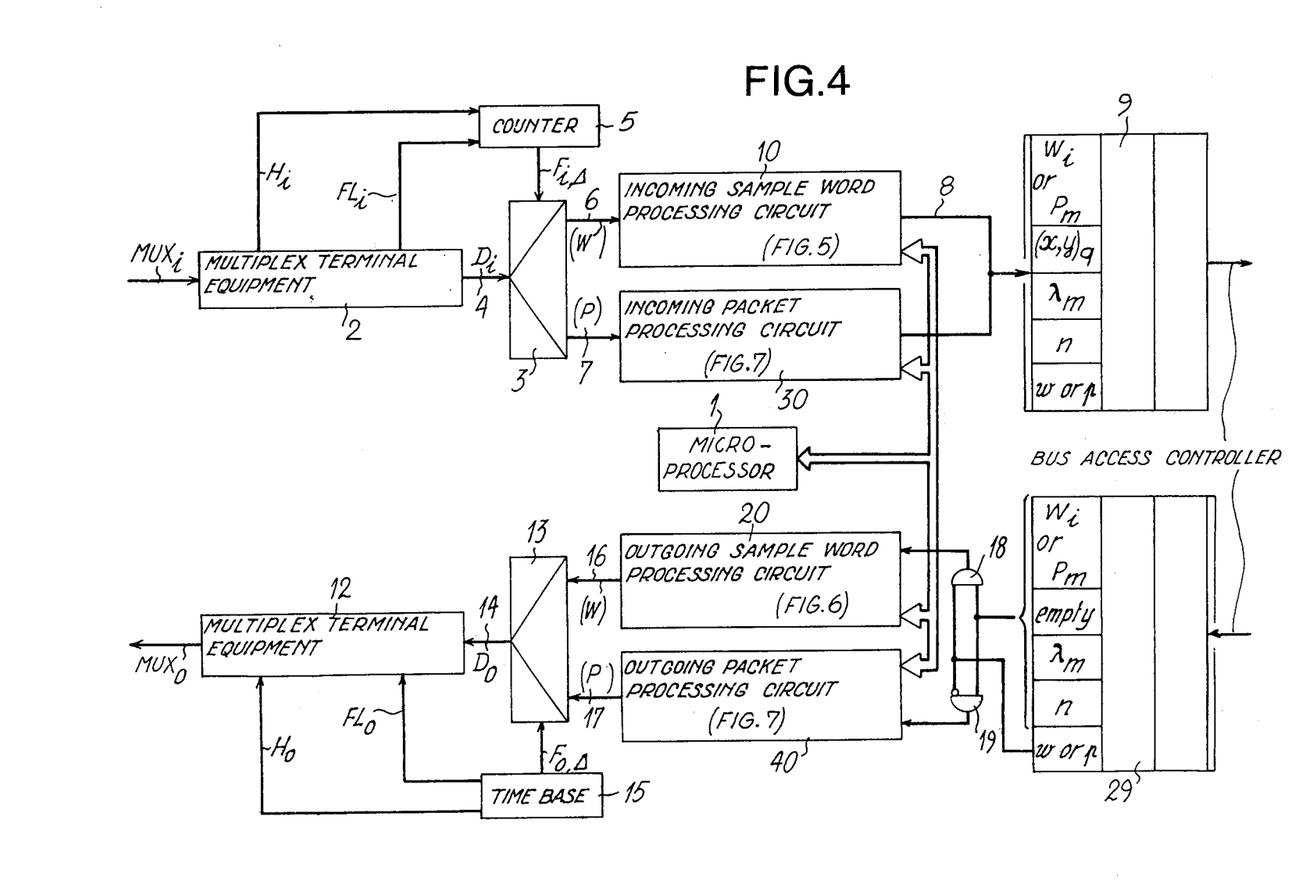
FIG. 4 depicts, in block diagram form, the terminal switching equipment of a switching station as in FIG. 3.
Figure 7:
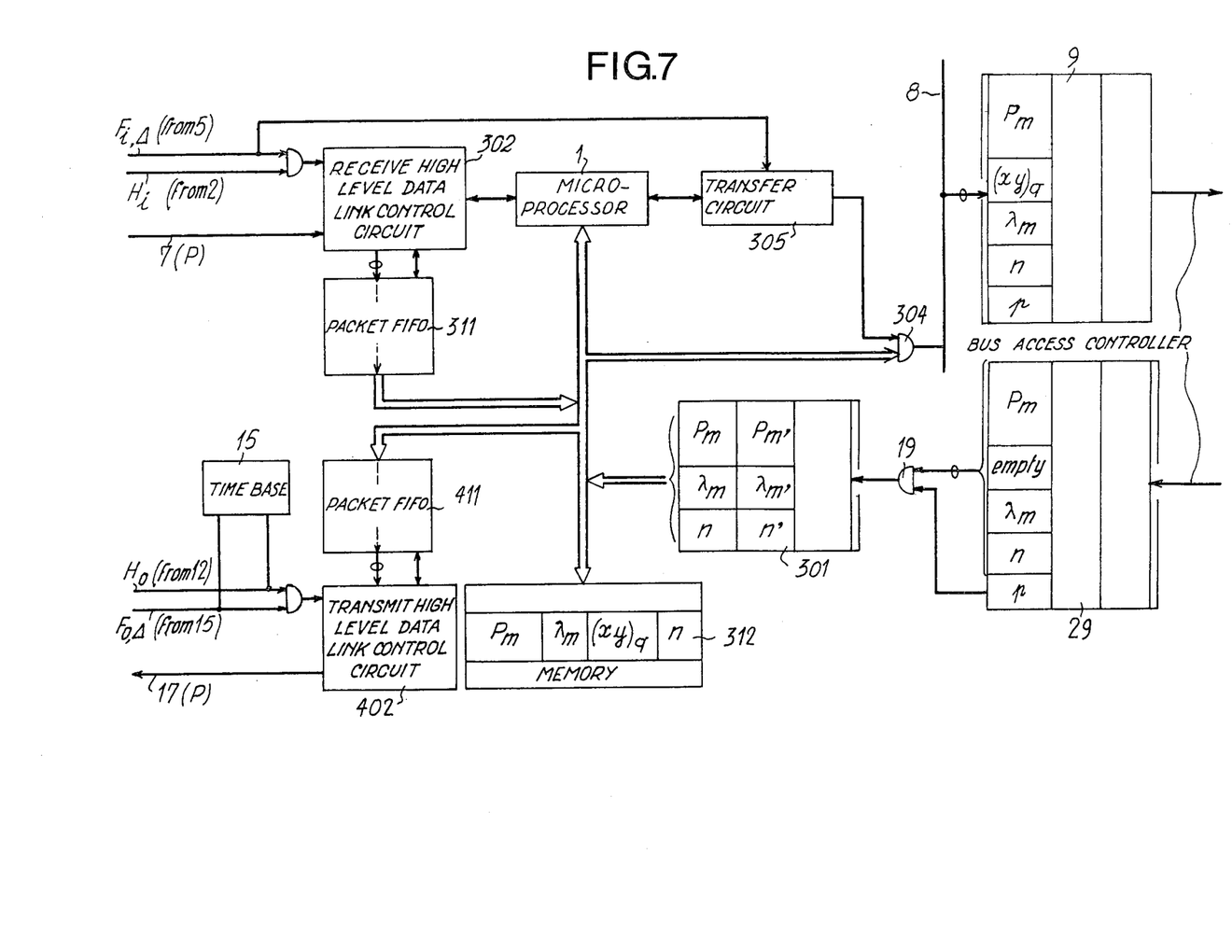
FIG. 7 depicts, in block diagram form, the incoming and outgoing packet processing circuits included in the terminal switching equipment as in FIG. 4.

Referring to FIG. 4, the reference number 2 designates an incoming multiplex terminal equipment item. It is connected to the incoming multiplex highway $MUX_i$ and separates the incoming data $D_i$ (sample words W and packets P) from the synchronization signals (clock signals $H_i$ and frame-synchro signals $FL_i$). Terminal multiplex equipment 2 is wired to a demultiplexer 3 via a line 4 and a counter 5. This counter 5 delivers pulses $L_i$ which mark the boundary between that part $F_{i,TS}$ of the frame containing time slots $TS_{i,m}$ and that part $F_{i,\Delta}$ of the frame containing the packet channels $\Delta_i$. Demultiplexer 3 issues incoming sample words W along line 6 and incoming packets P along line 7. The time slots sample words are processed in processing circuit 10 (FIG. 5) and the packets are processed in processing circuit 30 (FIG. 7). During the processing, the sample words W and the packets P are converted into messages as explained by adding to the sample word $W_m$ of time slot $TS_{i,m}$ and to the data in packet $P_m$ of packet channel $\Delta_{i,m}$ an indicator "w" or "p" which makes it known whether a sample word or a packet is concerned, the length $\lambda_m$ of the sample word or packet and the addresses $(x, y)_q$ and n respectively designating the outgoing multiplex highway and the number of the time slot or packet channel in the hybrid frame of the outgoing multiplex highway.

The meassage is fed into a local bus 8 and from there to the queueing circuit 9. The last stage of the queueing circuit supplies the bus access controller with messages and the bus access controller sends the message to the terminating station of addresses $(x, y)_q$ via transfer bus network 500.

The message free of the address $(x, y)_q$ which served to guide it to the terminating station is switched either towards outgoing sample word processing circuit 20 (FIG. 6) or towards outgoing packet processing circuit 40 (FIG. 7). This switching operation is achieved by reading the "w" or "p" indicator present in the message. Depending on the 1 or 0 value of this indicator, it opens one of AND gates 18 or 19, which guides the remainder of the message towards outgoing sample word processing circuit 20 or outgoing packet processing circuit 40.

In the processing circuits, the messages are stripped of their contents other than the sample word $W_m$ or the packet $P_m$. The sample words and packets are applied via lines 16 and 17 to multiplexer 13. Multiplexer 13 is connected by line 14 to terminal multiplex equipment 12. The latter receives, from time base 15, the clock pulses $H_o$ and the frame-synchro pulses $FL_o$ and the multiplexer receives the pulses $L_o$ from time base 15 that separate the time slot zone from the packet zone.

Figure 5:
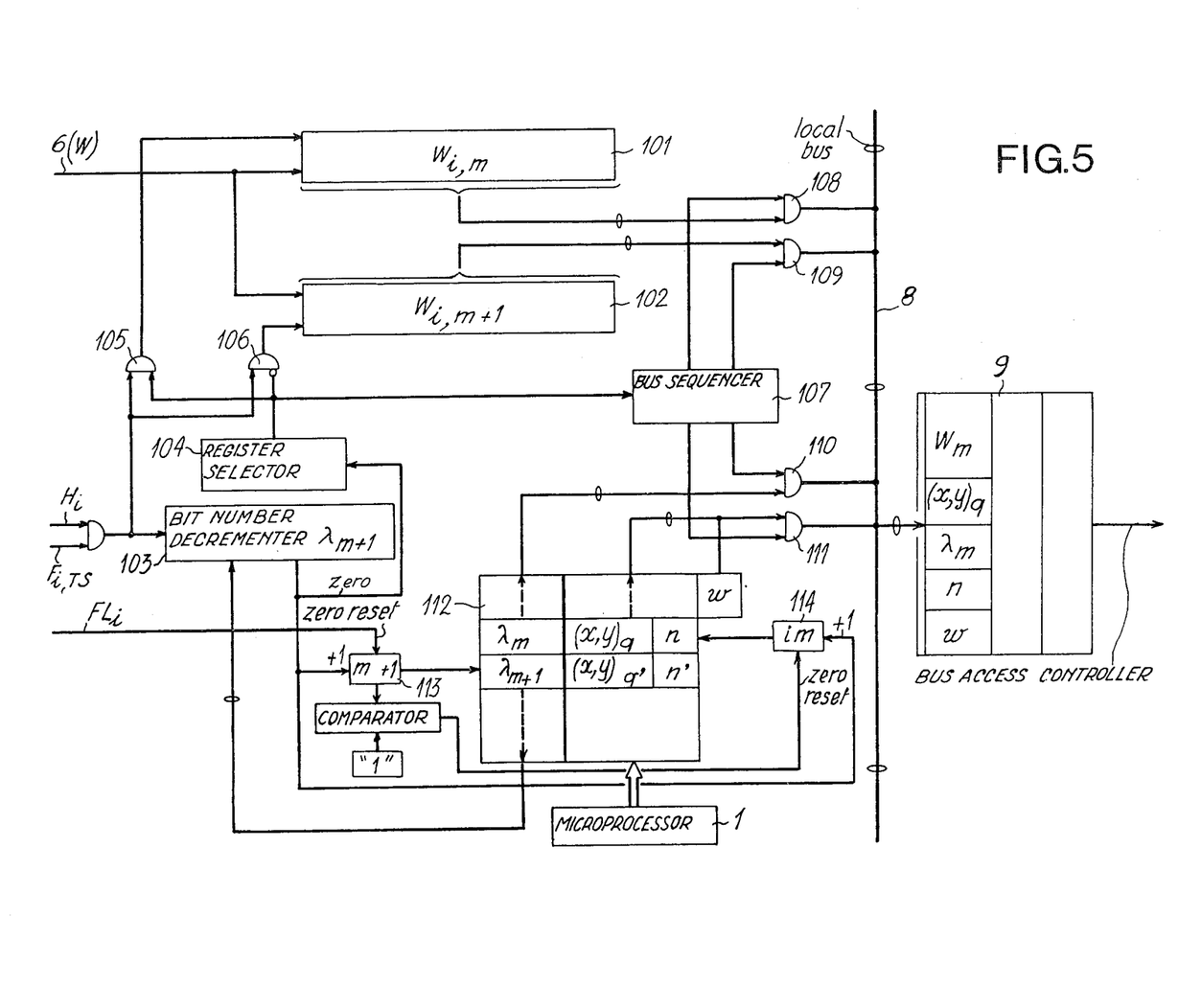
FIG. 5 depicts, in block diagram form, the incoming sample word processing circuit included in the terminal switching equipment as in FIG. 4.

Incoming sample word processing circuit 10 is illustrated in FIG. 5.

Line 6 which transmits the time slot sample words is connected to two shift registers 101 and 102 having capacities equal to the maximum number of bits that a word in the various time slots can carry. Shift registers 101 and 102 function as series-to-parallel converters and operate in opposition, i.e. one is being loaded in series whilst the other is being unloaded in parallel. As the bit capacity of the time slots $\lambda_m$ is not the same in different time slots, the going over from one series-to-parallel converter to the other comes about at the instigation of a bit number decrementer 103 and a register selector 104.

Decrementer 103, when it reaches zero controls register selector 104. The latter permits or inhibits the admission of clock pulses $H_i$ into the registers through AND gates 105 and 106. Register selector 104 further controls a bus sequencer 107 that connects the parallel outputs of shift registers 101 and 102 to local bus 8 alternately through AND gates 108 and 109.

Bus sequencer 107 further controls two AND gates 110 and 111 which monitor the admission, into local bus 8, of additional information for converting the sample word into a message.

This additional information is stored in table 112 and comprises:

the capacities or length $\lambda_m$ of the hybrid frame incoming time slot and packet channels;

the address $(x, y)_q$ of the outgoing multiplex highway, obtained by microprocessor 1 during the communication-establishing phase;

the number n of the outgoing time slot, obtained by the microprocessor 1 during the communication-establishing phase. The station $(x, y)_q$ must seek a time slot $TS_{o,n}$ that is both free and has the same capacity $\lambda_n$ as $\lambda_m$ in the multiplex highway $(x, y)_q$.

Each time decrementer 103 goes through zero, conters 113 and 114 are incremented by unity.

Counter 113 controls the entry of the quality $\lambda_{m+1}$ into decrementer 103.

Counter 114 controls the transfer of the information $\lambda_m$, $(x, y)_q$ related to the previous time slot along local bus 8 towards queueing circuit 9 across AND gates 110 and 111. Counter 113 is reset to zero by the frame-end pulse $FL_i$ and counter 114 is reset to zero when counter 113 marks up 1. At the same time as $\lambda_m$,n and $(x,y)_q$, the indicator "m" is included in the message.

Figure 6:
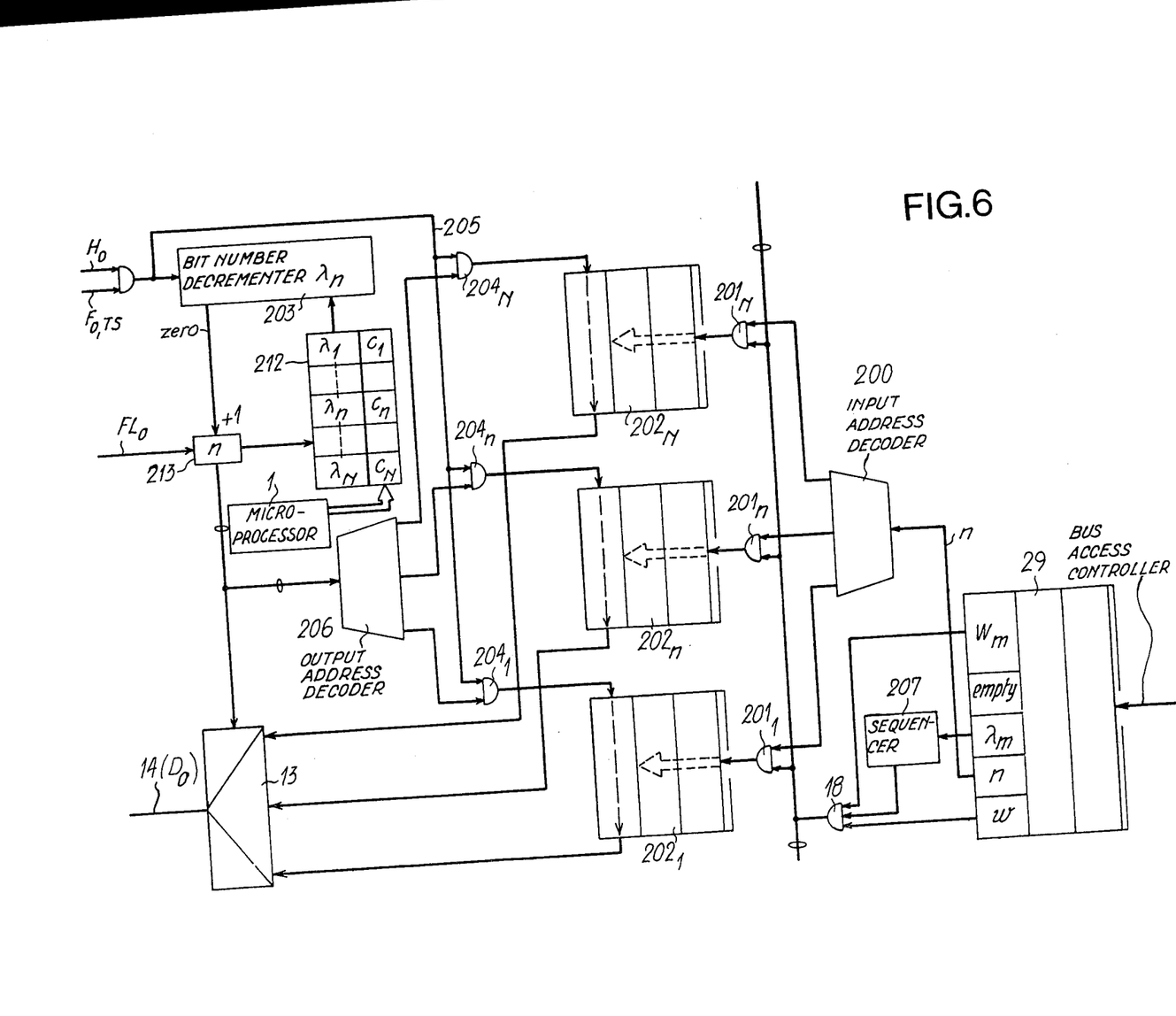
FIG. 6 depicts, in block diagram form, the outgoing sample word processing circuit included in the terminal switching equipment as in FIG. 4.

Referring now to FIG. 6, the message reeceived by the bus access controller is applied by the latter in parallel to queueing circuit 29. The data "w" or "p" and n in this message, i.e. the indicator characterizing a sample word or a packet and the number of the terminating time slot, are detected by AND gate 18 and input address decoder 200. Should the character "w" or "p" be a 1, then the decoder opens one of AND gates $201_1, \ldots 201_n, \ldots 201_N$ which give access to queueing lines $202_1, \ldots 202_n, \ldots 202_N$ respectively. These queueing circuits have parallel inputs and series outputs. The sample word $W_m$ is introduced into the queueing circuit corresponding to the address n, at the instigation of sequencer 207 to which $\lambda_m$ has been transmitted.

Queueing circuits $202_1, \ldots 202_n, \ldots 202_N$ transmit their content in series to multiplexer 13. They are activated by a signal coming from gates $204_1, \ldots 204_n, \ldots 204_N$ which itself comes from the clock $H_o$ during the pulse $F_{o,TS}$ and conveyed by wire 205. Gates $204_n$ are selected by means of address decoder 206. This address decoder is controlled by bit-number decrementer 203 which each time zero is reached increments counter 213.

A table 212 contains:

the capacities or lengths $\lambda_n$ of the hybrid frame outgoing time slots. These are permanent data that describe the structure of the outgoing multiplex highway;

the status bits $C_j$ which enable microprocessor 1 during the communication-establishing phase, to find a time interval $TS_{o,n}$ with a capacity $\lambda_n$ equal to $\lambda_m$. The bit $C_n$ is set to 1 when $TS_{o,n}$ is seized and then reset to 0 upon its being freed, at the end of the communication.

Counter 213 causes table 212 to advance at the generally irregular rhythm of the time slots.

FIG. 7, in block diagram form, depicts the incoming and outgoing packet processing circuits.

The incoming packets arrive, via line 7 in HDLC circuit 302 at the clock rhythm $H_i$ during the pulse $F_{i,\Delta}$. The receive HDLC circuit 302 performs as usual the packet determination in the continuous binary data flow and the series-to-parallel transconversion. The packets so formed by the receive HDLC circuit are sent at the arrival rhythm along incoming-packet FIFO stack 311.

Once a complete packet has been received, microprocessor 1 is informed accordingly by the HDLC circuit and it stores the packet $P_m$ and its length $\lambda_m$, the terminating multiplex highway address $(x, y)_q$ and the output packet channel number n in memory 312.

When the message formed by the information items $P_m$, $(x, y)_q$, $\lambda_m$, n and the indicator p is ready, microprocessor 1 advise transfer circuit 305 which, through gate 304, authorizes the transfer of the message to queueing circuit 9 during $F_{i,\Delta}$ period during which time local bus 8 is free.

The message received by the bus access controller is applied to overall queueing circuit 29. It is applied through gate 19, the state of which depends on the indicator p, to packet queueing circuit 301. The microprocessor reads in this queueing circuit the packet length $\lambda_m$, then the packet $P_m$ and the output packet channel number n and next forms the corresponding outgoing packet that it places in outgoing packet FIFO 411.

At the $H_o$ rate during $F_{o,\Delta}$, these signals emanating from time base 15, transmit HDLC circuit 402 picks the packet out of FIFO 411 and transmits it according to the HDLC procedure along line 17 towards multiplexer 13.

What we claim is:

1. Asynchronous time division multiplex switching network for multiservice digital network, comprising :
  a plurality of time division multiplex bidirectional highways conveying digital data arranged in a hybrid frame including a time slot part and a packet channel part, said time slot part being formed of a plurality of time slots containing sample words having a variable number of bits and said packet channel part being formed of a plurality of channels for packets having a variable number of bits;
  a plurality of data transmit and receive stations, connected to and associated with said bidirectional highways;
  a plurality of buses connecting said transmit and receive stations therebetween and selectively interconnecting an originating bidirectional highway to a terminating bidirectional highway through an originating and a terminating transmit and receive stations;

means in each transmit station for converting the sample words in the time slot part of the hybrid frame and the packets in the packet channel part of said hybrid frame of an originating highway into a message including, for the sample word in each time slot, the said sample word, its number of bits, the address of the terminating highway, the number of the time slot in the hybrid frame of said terminating highway and a first sort-of-data indicator marking sample words and, for the packet in each packet channel, the said packet, its number of bits, the address of the terminating highway, the number of the packet channel in the hybrid frame of said terminating highway and a second sort-of-data indicator marking the packets;

means for transmitting said messages from said originating highway to said terminating highway;

means in each receive station for deleting from said messages the number of bits of the sample words and packets, the address of the terminating highway, the number of the time slots and packet channels and the first and second data indicators;

means for memorizing said time slot and packet channel numbers and said first and second data indicator; and means for inserting in the hybrid frame of the terminating highway the sample words and packets depending on said time slot and packet numbers and data indicators.

2. Asynchronous time division multiplex switching network as set forth in claim 1, in which the means for converting the sample words in the time slots of the hybrid frame and the packets in the packet channel of the hybrid frame of any originating highway into messages comprises storing means for storing a group of information items composed of the numbers of the time slot containing a sample word to be switched or the number of bits of a packet channel containing a packet to be switched, the address of the terminating highway and the address of the time slot or packet channel in the hybrid frame of said terminating highway, a decrementer of said number of bits, a parallel-to-series converter for serially entering into said converter the bits of the sample word or packet to be switched, means for controlling the parallel output of said converter by said decrementer reaching zero and means for adding to said sample word or packet, said group of information items.

* * * * *